United States Patent [19]

Pratt, Jr.

[11] Patent Number: 5,042,756
[45] Date of Patent: Aug. 27, 1991

[54] FLIP-FLOP CABLE TRAY WALKWAY

[75] Inventor: Robert W. Pratt, Jr., Lake Jackson, Tex.

[73] Assignee: The Dow Chemical Company, Midland, Mich.

[21] Appl. No.: 496,385

[22] Filed: Mar. 20, 1990

[51] Int. Cl.⁵ .......................... F16L 3/00; F16L 3/22
[52] U.S. Cl. ..................................... 248/49; 248/68.1
[58] Field of Search ........................... 248/68.1, 49, 58

[56] References Cited

U.S. PATENT DOCUMENTS

| | | |
|---|---|---|
| 3,602,467 | 8/1971 | Thomas . |
| 3,618,882 | 11/1971 | Podedworny . |
| 3,770,233 | 11/1973 | McElroy . |
| 3,851,378 | 12/1974 | Dessert . |
| 3,915,420 | 10/1975 | Norris . |
| 3,938,776 | 2/1976 | Frazier . |
| 4,046,343 | 9/1977 | Kambara ........................... 248/49 |
| 4,244,545 | 1/1981 | Berry . |
| 4,252,045 | 11/1980 | Turner ............................... 248/49 |
| 4,433,732 | 2/1984 | Licht et al. . |
| 4,733,986 | 3/1988 | Kenning et al. . |

Primary Examiner—Robert L. Wolfe

[57] ABSTRACT

Flip-flop cable tray walkway and cable tray with flip-flop walkway system that is movable from above one cable tray to an adjacent cable tray. Movable walkway members mounted to articulation devices can be initially positioned above one cable tray permitting workers to stand thereon while accessing adjacent trays and their contents, the walkway members movable to permit access to the tray on which they are initially positioned or to permit access to trays that are initially too far away for efficient access.

22 Claims, 4 Drawing Sheets

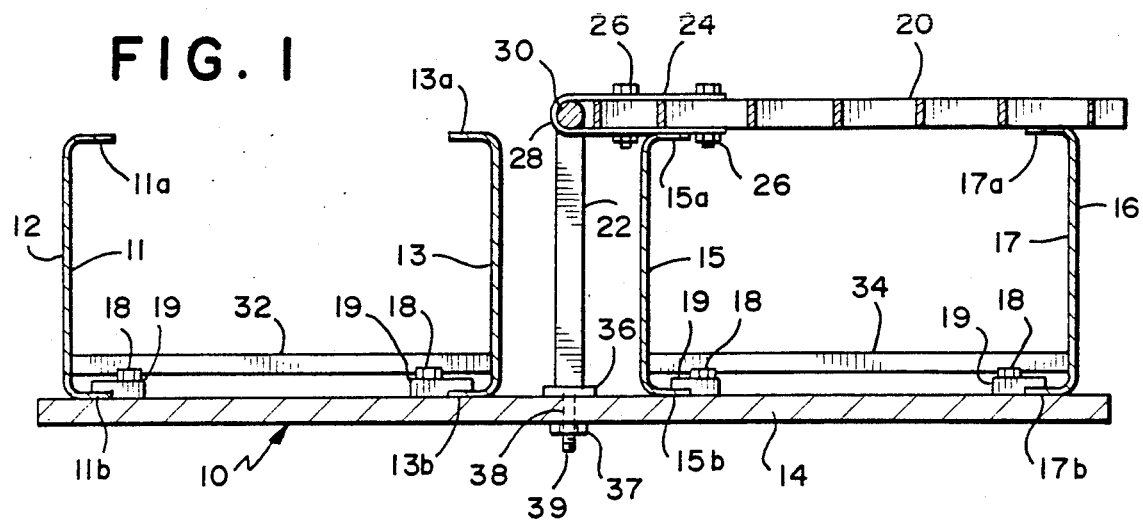
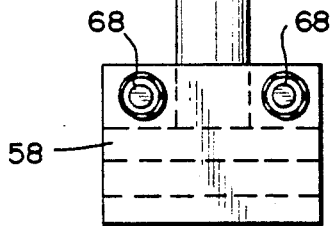
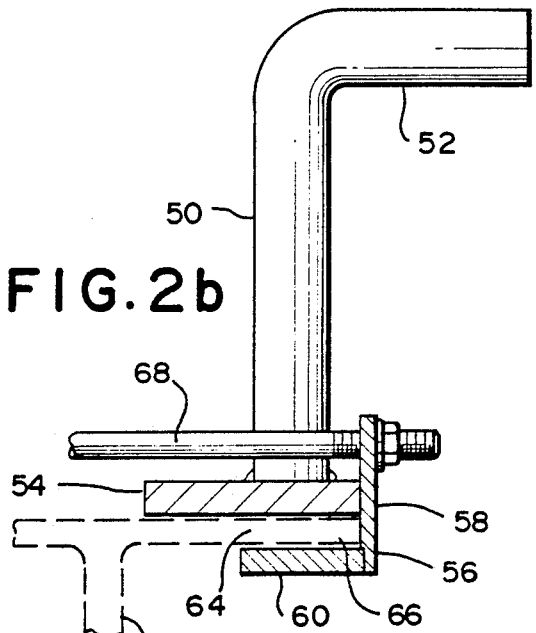
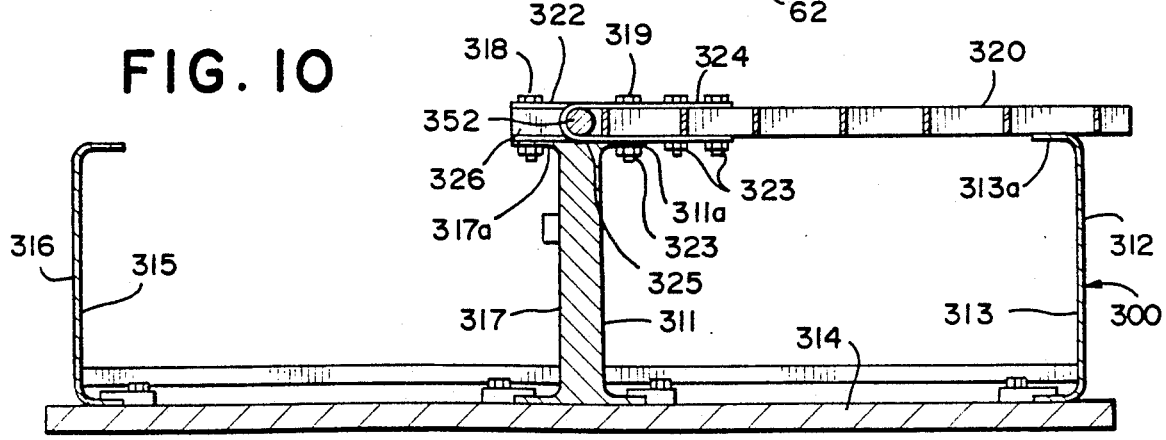

FLIP-FLOP CABLE TRAY WALKWAY

BACKGROUND OF THE INVENTION

1. Field of the Invention

This invention is related to cable racks or trays and to walkways for accessing cable trays. In one particular embodiment, it is related to a cable tray walkway hinged at the side for movement away from the cable tray to permit access to cable tray and for emplacement over an adjacent cable tray.

2. Disclosure of Related Art

Conventional cable racks or trays are used in various industries to support a plurality of cables, pipes and other tubular members for transmitting fluid, gases, or electrical power to various locations, both indoors and outdoors, in a building, plant, refinery, or other facility. Generally cable trays are made from multiple interconnected tray sections which can be straight or curved to follow the contour of a wall or other structure. Individual tray components that are spliced together with conventional splicing structures can be easily disconnected, reconfigured, or re-positioned.

Two known types of cable trays each include a general channel construction with parallel side members or rails. In one type, perforated sheet metal forms the bottom of the cable tray. In another type, a plurality of transverse rungs or struts extend between the parallel rails to support cables, etc. These rungs can be mechanically or adhesively connected to the side members. Perforations in sheet metal or spaces between rungs provide for air circulation around the cables, permitting heat dissipation if desired.

The supported cables may be very small (e.g., 0.1 inches in diameter) or up to 5 or 6 inches in diameter or larger (usually limited by the depth of the tray, but cables could protrude above the top of the tray). Typically, a plurality of cables are disposed in each cable tray and a plurality of cable trays of the same or different widths may be positioned adjacent to one another. In typical operations, access to the cable trays is required for originally laying cable, for inspecting and repairing it, and for removing it. Prior unsafe practices include walking on the cables themselves or trying to balance on a tray side rail. Walking on the cables can damage them.

Walkways have been constructed next to cable trays. These structures can be relatively expensive and they can occupy space which might be used more beneficially. Also, such a structure adjacent a row of several cable trays does not provide access to the trays furthest away from the structure.

In accordance with 37 C.F.R. §1.56, the following are disclosed:

- U.S. Pat. No. 4,733,986 discloses a splice plate for cable trays.
- U.S. Pat. No. 4,433,732 discloses a fireproofing system for cable trays in which the trays are enclosed in sheets of an intumescent fire retarding material.
- U.S. Pat. No. 4,244,545 discloses a clamp for a cable tray conduit.
- U.S. Pat. No. 4,046,343 discloses a cable tray with side plates, transverse supporting frames, and a cover plate secured to the side rails.
- U.S. Pat. No. 3,915,776 discloses a form for making reusable panels.
- U.S. Pat. No. 3,915,420 discloses a cable tray with side rails and transverse rungs.
- U.S. Pat. No. 3,851,378 discloses a method for making cable trays from side rails and transverse rungs.
- U.S. Pat. No. 3,770,233 discloses a cable tray draw mechanism for drawing cables onto trays.
- U.S. Pat. No. 3,618,882 discloses a cable tray with side rails and transverse cable supporting sections.
- U.S. Pat. No. 3,602,467 discloses a cable draw mechanism.

There has long been a need for safe and easy access to the cables, etc. supported in cable trays or racks. There has long been a need for such access to all of a plurality of adjacent cable trays. There has long been a need for a system for cable tray access which does not adversely impede the desired flow of air around cables in cable trays and in which the tray contents are adequately ventilated.

SUMMARY OF THE PRESENT INVENTION

The present invention is directed to cable trays which can be accessed easily and to walkways for cable trays. In one embodiment of a cable tray according to the present invention, a tray is provided which has parallel opposed spaced-apart side rails between which are interposed a plurality of transverse rungs. The side rails contain cables placed on the rungs and the rungs support the cables. The rungs may be supported by the side rails. In this embodiment, sections of perforated grating are hingedly connected to a support member extending beneath the cable tray. The grating, made preferably of fiberglass reinforced plastic, is movable so that it can be lifted up to permit access to the cables in the cable tray. The grating can be held upright or it can be flipped over onto an adjacent second cable tray. A worker can then stand on the grating while working on the cables in the first cable tray or while working on the first cable tray itself.

Various other embodiments of the present invention include connection of the hinged structure to cable trays themselves or simple disposition of an unconnected hinge support between cable trays or between a cable tray side rail and another member. Although a perforated grating (preferably made from FRP) as described is preferred for strength, for ventilation, for dealing with corrosive environments, and for visual inspection of cables under the grating; other types of hinged walkway members can be employed such as solid or perforated plates or sheets of material sufficiently strong to support a person. Also the hinged walkway can be supported on each side by members other than the tray side rails.

The present invention recognizes, addresses, and satisfies the previously-described long felt needs.

It is, therefore, an object of the present invention to provide new, useful, unique, efficient and nonobvious cable trays and movable walkways for cable trays.

Another object of the present invention is the provision of a cable tray with a walkway member disposed on top of and hingedly connected at or to a side of the cable tray so that upon movement of the walkway member access to cables within the tray is permitted.

A further object of the present invention is the provision of such a movable walkway for a cable tray which can be connected to a supporting member adjacent to (rather than part of) a cable tray or which can be connected to a member for disposition adjacent to a cable tray on a supporting member without connection to the tray or the supporting member.

An additional object of the present invention is the provision of such a movable walkway which need not rest on the cable tray side rails.

Yet another object of the present invention is the provision of such a walkway member which can be flipped from above a first cable tray to a position above and/or on an adjacent second cable tray permitting access to cables in the first tray while standing on the flipped walkway member.

Another object of the present invention is the provision of a cable tray system and of a cable tray walkway utilizing perforated walkway members for providing either ventilation to the tray's contents or visual access or both.

To one of skill in this art who has the benefits of this invention's teachings and disclosures, other and further objects and advantages will be clear, as well as others inherent therein, from the following description of presently-preferred embodiments, given for the purpose of disclosure, when taken in conjunction with the accompanying drawings. Although these descriptions are detailed to insure adequacy and aid understanding, this is not intended to prejudice that purpose of a patent which is to claim an invention no matter how others may later disguise it by variations in form or additions or further improvements.

DESCRIPTION OF THE DRAWINGS

So that the manner in which the above recited features, advantages and objects of the invention, as well as others which will become clear, are attained and can be understood in detail, more particular description of the invention briefly summarized above may be had by reference to certain embodiments thereof which are illustrated in the appended drawings, which drawings form a part of this specification. It is to be noted, however, that the appended drawings illustrate preferred embodiments of the invention and are therefore not to be considered limiting of its scope, for the invention may admit to other equally effective equivalent embodiments.

FIG. 1 is an end view in cross-section of a cable tray with a hinged walkway member according to the present invention.

FIG. 2a is a side view of a hinged connection of a cable tray walkway member according to the present invention. FIG. 2b is a front view of the member of FIG. 2a.

FIG. 3b is an enlarged side view in cross-section of a hinge, support and walkway member shown in FIG. 3a.

FIG. 8b is an end view of one end of an access station for a system like that of FIG. 8a.

FIG. 10 is an end view cross-section of a cable tray system according to the present invention.

DESCRIPTION OF PREFERRED EMBODIMENTS

Figure 3A:
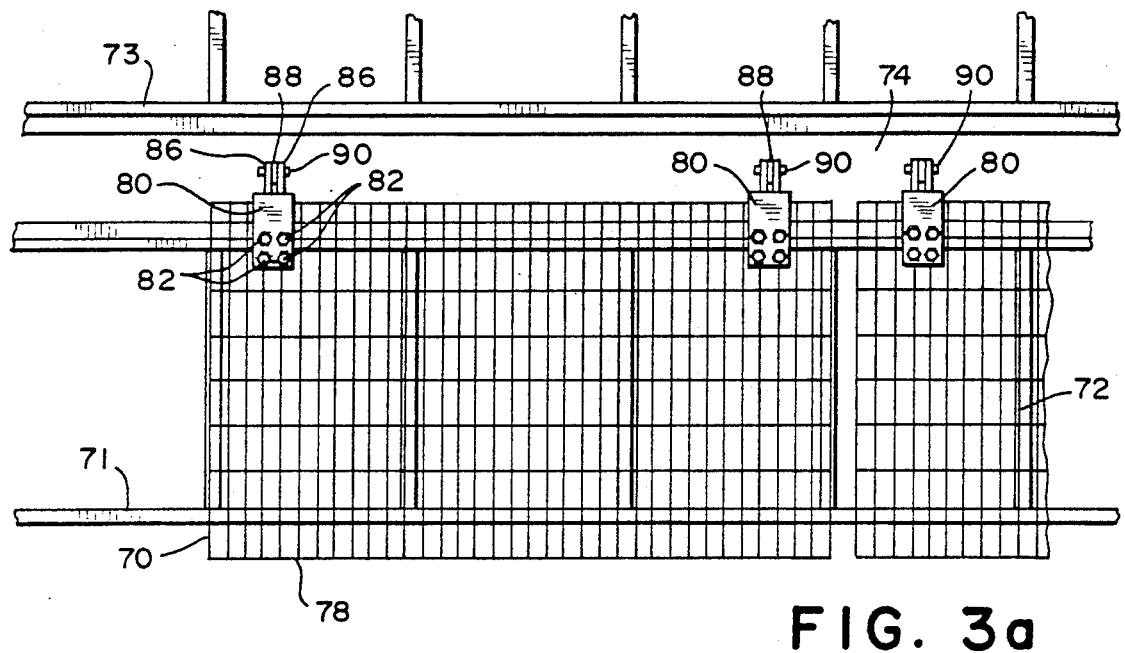
FIG. 3a is a top view of hinged cable tray walkway members according to the present invention.

Referring now to FIG. 1, a cable tray system 10 has two cable trays 12 and 16 supported on a plurality of supports 14 (one shown). The cable tray 12 has two parallel opposed side rails 11 and 13. The cable tray 16 has two parallel opposed side rails 15 and 17. Each side rail has in-turned ends 11a, 11b, 13a, 13b, 15a, and 17a, 17b, respectively. (Of course this invention is equally applicable to trays without such in-turned ends.) Holding devices 19 bolted to the support 14 by bolts 18 hold the various in-turned ends 11b, 13b, 15b and 17b to secure their respective rails to the support member 14. Additional holding devices 19 secure the rails to the other support members which are not shown. (As shown in FIG. 1, the support 14 could be supported by tray side rails)

A walkway member 20, hingedly connected to a hinge support 22 by a bracket 24 and bolts 26 extends over the cable tray 16 and rests upon the in-turned ends 15a and 17a. A curved portion 28 of the bracket 24 encircles a horizontal arm 30 of the hinge support 22 for providing pivoting movement of the walkway member 20. The member 20 can be pivoted 180° to rest upon the in-turned ends 11a and 13a of side rails 11 and 13 respectively, providing a walkway over the cable tray 12 and a place for a worker to stand while inspecting or working on cables in cable tray 16. The cables (not shown) rest on a plurality of transverse rungs extending across and between the side rails 11, 13 of cable tray 12 (e.g. rung 32) and between the side rails 15, 17 of cable tray 16 (e.g. rung 34).

The hinge support 22 has a lower base plate 36 and a bottom portion 38 that extends through the support member 34. A nut 37 threadedly engages a threaded end 39 of the hinge support 22.

Referring now to FIGS. 2a and 2b, an alternative mounting for a hinge support is shown for use when a supporting beam transverse to a cable tray (as opposed to transverse supports such as support member 14 in FIG. 1) is to provide the mounting for a hinge support. A hinge support 50 has a horizontally extending arm 52 to which a walkway member bracket 53 (like bracket 24 in FIG. 1) can be mounted. The hinge support 50 has a base member 54 and a clip member 56 which has an upright portion 58 and a bottom portion 60. The hinge support is positioned on a beam 62 with the base 54 resting on an arm 64 of the beam 62 and the upright portion 58 abutting an end 66 of arm 64. The bottom portion 60 of the hinge support 50 lies beneath the arm 64. Bolts 68 extend through the upright portion 58 to another hinge support (not shown) on the beam 62 opposite the hinge support 50, thereby securing the two hinge supports to the beam. If parallel supporting members are present, then the hinge support can be turned 90° and be connected to the parallel supporting members.

Figure 3B:
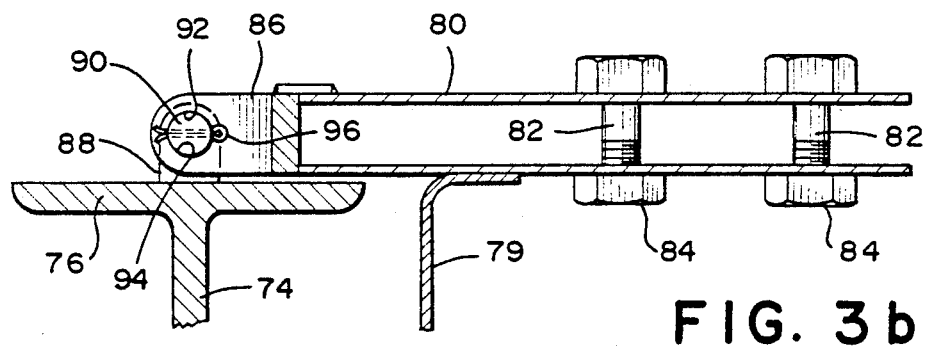

FIGS. 3a and 3b show two cable tray walkway members 70 and 72 (partially shown) side-by-side on a top 76 of a beam 74 which extends lengthwise between two cable trays (71, 73). The walkway member 70 includes a grating 78 made preferably of fiberglass reinforced plastic which supports the weight of workers walking on the member 70. Two brackets 80 are bolted to the walkway member 70 by bolts 82 and nuts 84. Two arms 86 extend from each of the brackets 80 for mounting about a neck 88 extending upward from the top 76 of the beam 74. Each bracket is mounted to a neck 88 by a pin 90 which extends through holes 92 in the arms 86 and through a hole 94 in the necks 88. A cotter pin 96 extends through each end of the pin 90 to hold it in place. (Note that the grating 78 is not shown in FIG. 3b). A worker can view the contents of the tray through the grating 78 and ventilation is provided through the openings in the grating to contents of the tray beneath the grating. One hinge could be employed for moving the grating, but two or more are preferred.

The construction shown in FIGS. 3a and 3b permits the walkway members 70 and 72 to be flipped over, pivoting about the necks 88 of the beam 74, to expose a cable tray under the walkway members as shown in FIG. 3a. The bolts 82 are positioned so that they will not interfere with either the top 76 of the beam 74 or a siderail 79 and the walkway members will lie flat whichever way they are directed.

Figure 4:
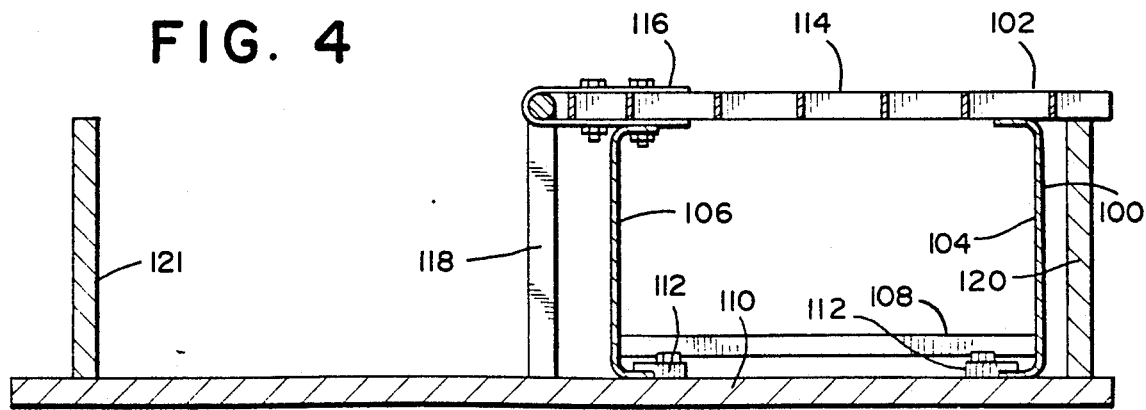
FIG. 4 is a end view in cross-section of a cable tray with a hinged walkway member according to the present invention.

Referring now to FIG. 4, a cable tray 100 is shown with a walkway member 102 over it. The cable tray 100 has two parallel opposed side rails 104, 106 interconnected by a plurality of transverse rungs 108 (one shown). The cable tray 100 is secured to transverse supporting members 110 (one shown) by holding devices 112 which clip over in-turned ends of the side rails 104, 106 and are bolted to the supporting members 110.

The walkway member 102 has a grating 114 (like the grating 78 in FIG. 3a) which has brackets 116 (like the brackets 80 in FIG. 3a) (one shown) which hingedly connect the walkway member 102 to a hinge support 118 (like the hinge support 22 in FIG. 1). As shown in FIG. 4, the grating 114 does not touch the side rails 104, 106 of the cable tray 100, but rests on an upright support member 120 which extends upwardly from the transverse support members 110. If desired, the walkway member 102 could be disposed and configured so that it would contact the side rails 104, 106 as well as the support member 120 or the member 120 could be eliminated with the walkway member resting on the side rails alone. A support 121 is provided for supporting the walkway member 102 when it is rotated away from the tray 100.

Figure 5:
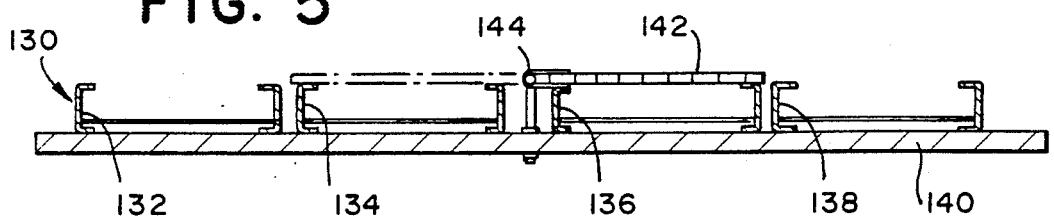
FIG. 5 is an end view in cross-section of a cable tray system according to the present invention.

FIG. 5 illustrates a cable tray system 130 according to the present invention which has a plurality of cable trays 132, 134, 136, 138 side-by-side supported by a plurality of support members 140 (one shown) and a plurality of walkway members 142 (one shown) hingedly mounted between the cable trays 134 and 136 on the support members 140. The walkway members are positioned so that access is possible to cables within any of the cable trays while standing on a walkway member.

As shown in FIG. 5, the walkway member 142 is positioned over cable tray 136. A worker can stand on the walkway member and have access to the contents of either cable tray 138 or cable tray 134. An alternate position for the walkway member 142 is shown in outline in FIG. 5. This is the position of the walkway member after it has pivoted on a hinge 144 (like the hinging arrangement shown in FIG. 1). In the alternate position over cable tray 134, a worker can stand on the walkway member and have access to cable trays 132 and 136.

Figure 6:
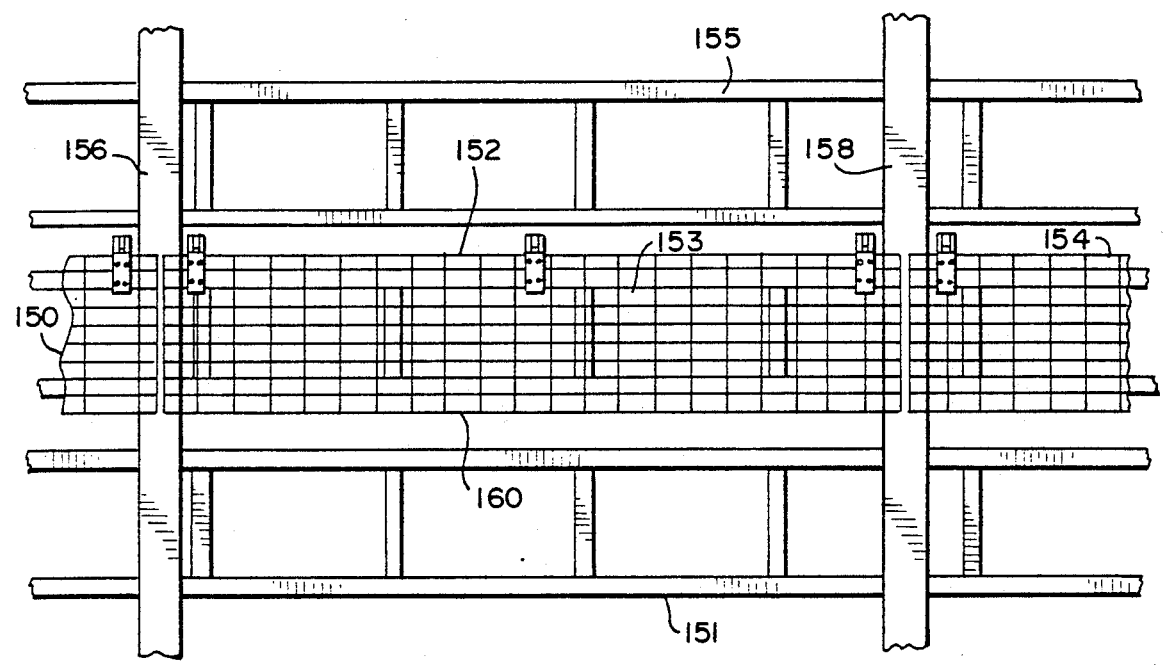
FIG. 6 is a top view of a cable tray walkway system according to the present invention.

Referring now to FIG. 6, a cable tray walkway system 160 is shown in which walkway members 150, 152, and 154 (150 and 154 shown partially) are mounted between transverse supporting members, such as members 156 and 158 with a mounting as shown in FIG. 2b and as described above, as well as to hinge supports (like that shown in FIG. 1) which are mounted to the supporting members 156, 158. The supporting members 156, 158 support cable trays 151, 153 and 155.

Figure 7:
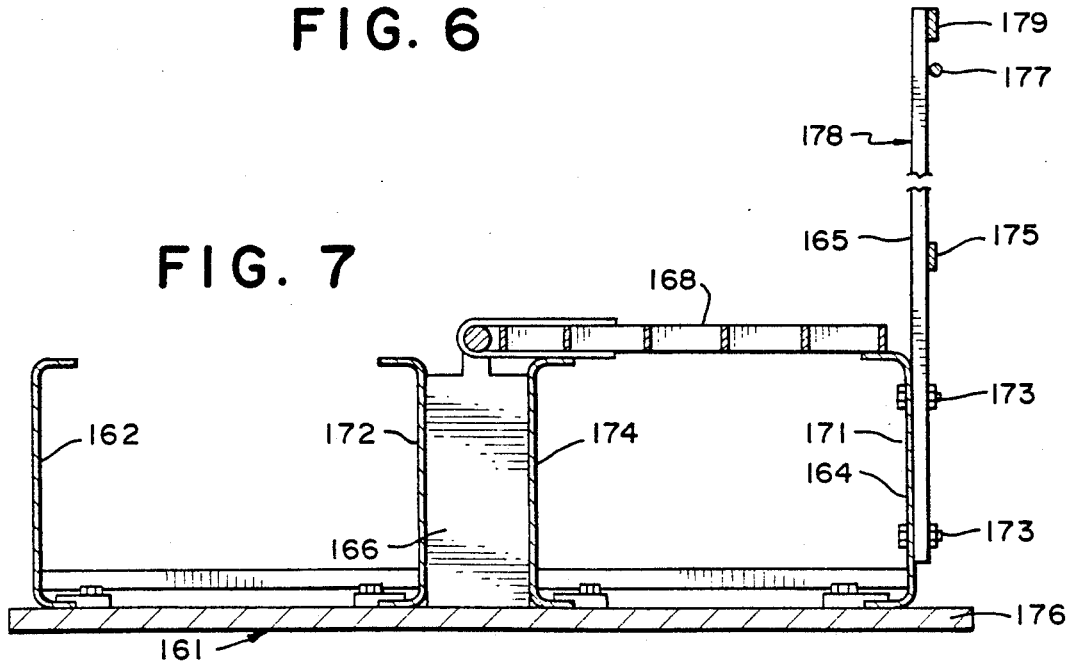
FIG. 7 is an end view in cross-section of a cable tray system according to the present invention.

FIG. 7 illustrates another embodiment of a cable tray system 161 and movable walkway for cable trays according to the present invention. Between two cable trays 162 and 164 are disposed supporting blocks 166 (one shown) to which is hingedly connected a walkway member 168 (like that of FIG. 1). The blocks 166 are configured to sit between inner side rails 172, 174 of the trays 162, 164 respectively without any securement thereto or to a supporting member 176 beneath the cable trays. If desired, the blocks 166 could be bolted or glued to either the side rails, the supporting member, or both. A handrail assembly 178 is connected to the tray 164. Bolts 173 extend through a tray side rail 171 and secure upright members 165 (one shown) to the side rail. Horizontal members 175 and 179 extend between upright members 165 as does a cable 177 to which a safety lanyard or other device may be attached.

Figure 9:
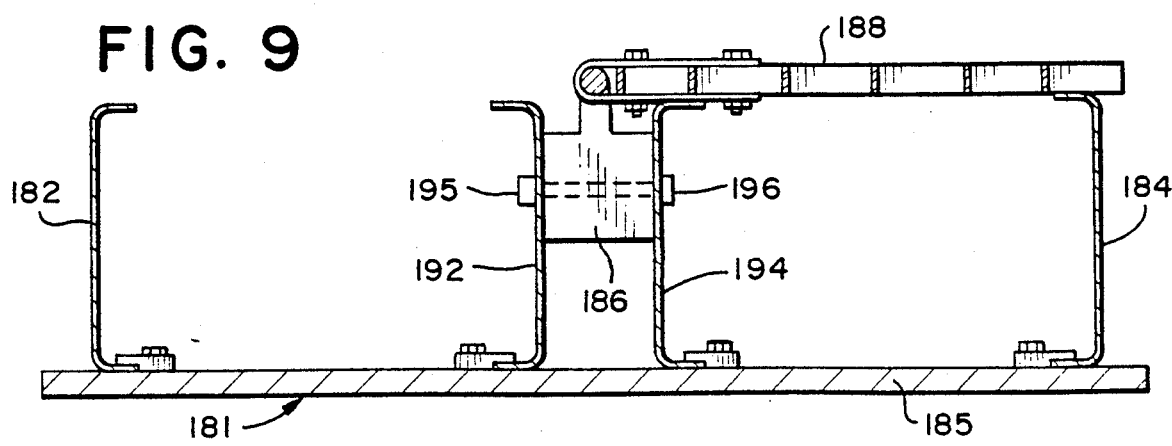
FIG. 9 is an end view in cross-section of a cable tray system according to the present invention.

Referring now to FIG. 9, a cable tray system 181 is disclosed which is similar to that of FIG. 7. Between two cable trays 182 and 184 are disposed blocks 186 (one shown) to which is hingedly connected a walkway member 188 (like that of FIG. 1). The blocks 186 are secured to side rails 192, 194 of the trays 182, 184 respectively by bolts 195 (one shown) and nuts 196. The walkway member 188 as shown rests on the cable tray 184. The trays 182, 184 are secured to supporting members 185 (one shown) as shown and described above with respect to the system of, e.g., FIG. 1. Of course it is within the scope of this invention to secure a hinged walkway member to an individual cable tray or only to one of two adjacent trays.

Figure 8A:
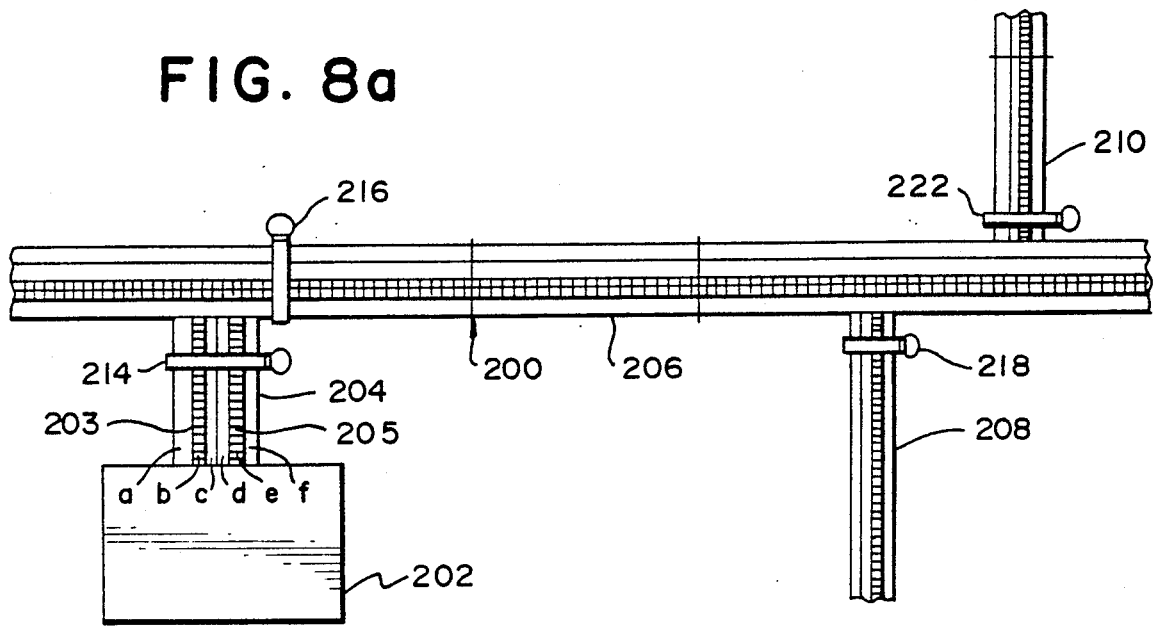
FIG. 8a is a top view of a cable tray walkway system according to the present invention.

FIG. 8a illustrates schematically a multi-tray, multi-direction cable tray system 200 according to the present invention. The system 200 extends from a control center in a building 202 to system legs 204, 206, 208, and 210. In leg 204 there are six cable trays a, b, c, d, e, f with a second tray b and a fifth tray e (from the left in FIG. 8a) having disposed thereon flip-flop walkway members 212 according to the present invention (such as previously described above for FIGS. 1, 2a, 3a, 4, 5, 6 or 7). In legs 206, 208, and 210, there are four rows of cable trays and over one row are walkway members according to this invention indicated by crosshatching on that row of cable trays. At various locations in the system 200, access platforms 214, 216, 218 and 220 are provided for easily ascending to the height of the cable trays for easily stepping onto the walkway members. It should be noted that each of the legs 206, 208, 210 has walkway members pivotable between the two middle rows allowing a worker to access all four rows of cable trays in the leg; i.e., as shown a worker can access cable trays on either side of the walkway members while standing on the walkway members and, after flipping the walkway members over onto the other middle tray, a worker can access both the cable tray over which the walkway member was originally positioned and the cable tray which originally was two cable trays distant from the walkway members. In leg 204 there are six cable trays (a, b, c, d, e, f) and two rows (203, 205) of hinged walkway members. Thus by appropriate movement of the walkway members, any cable tray in leg 204 can be accessed.

Figure 8B:
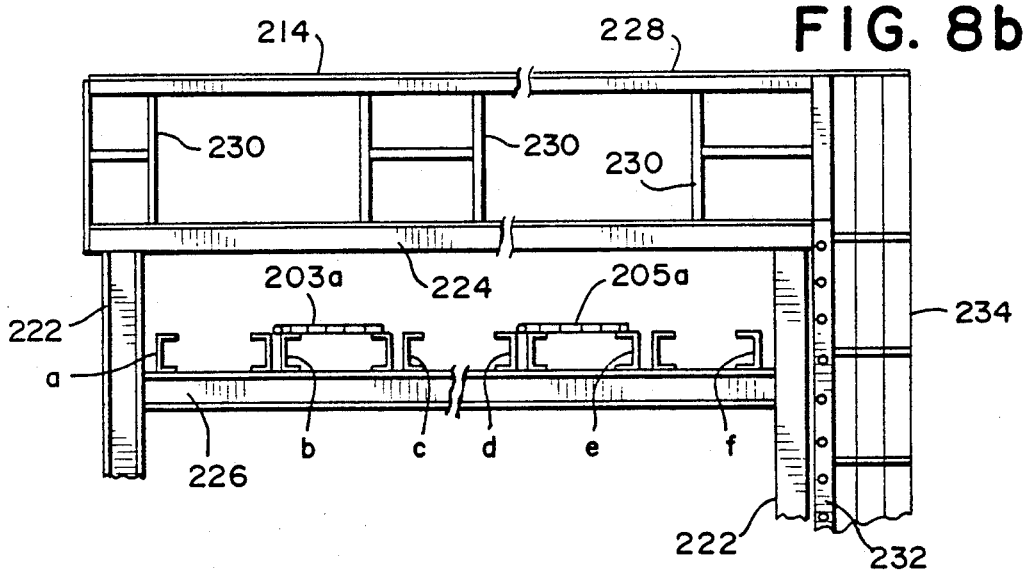

Access platform 214 is shown in detail in FIG. 8b. Upright members 222 support a transverse walkway 224 that extends above the cable trays a, b, c, d, e, f. The cable trays are supported on a transverse support member 226. A handrail 228 is supported above the walkway 224 by handrail supports 230. A ladder 232 on the side of the platform 214 permits access to the walkway 224 and a cage 234 adjacent the ladder provides for a worker's safe ascent of the ladder. A cable can be provided along the walkway to which a worker's safety lanyard can be hooked.

Referring now to FIG. 10, a cable tray system 300 has two cable trays 312 and 316 supported on a plurality of supports 314 (one shown). The cable tray 312 has two side rails 311 and 313. The cable tray 316 has two side rails 315 and 317. In-turned ends 311a and 313a of tray 312 and 317a of tray 316 support a walkway member 320 which is hingedly connected to a hinge support 322. The hinge support 322 is secured to the in-turned end 317a of tray 316 by a bolt 318 and to the in-turned end 311a of tray 312 by a bolt 319. A bracket 324 to which the walkway member 320 is secured by bolts 323 has a circular member 325 which movably encircles a horizontally extending arm 352 (like arm 52 in FIG. 2b) which extends from a main body 326 of the hinge support 322. Although the hinge support is shown as secured to two cable trays, it is within the scope of this invention to secure it to only one tray.

Although it is generally preferred that walkway members according to the present invention extend along all or substantially all of the length of a cable tray, it is within the scope of this invention to provide such flip-flop walkway members on only a portion of a cable tray or only at selected intermittent locations on a cable tray. It is also within the scope of this invention to provide such walkway members on a single isolated cable tray. In that embodiment a worker could hold up a walkway member while working on the tray under the walkway member or means can be provided for holding or supporting the walkway member while a worker works on the tray or its contents. By employing walkway members which need not necessarily be permanently or semi-permanently secured to a tray or a support, a portable walkway is made possible which can be moved as desired. Use of such portable walkway members eliminates the necessity for permanent installations and for completely covering the entire length of a cable tray. Although various hinges are disclosed as articulation means for walkway members, any suitable hinge, articulation device, or their equivalents may be employed and these are understood and meant to come within the scope of "articulation means".

In conclusion, therefore, it is seen that the present invention and the embodiments disclosed herein are well adapted to carry out the objectives and obtain the ends set forth at the outset. Certain changes can be made in the method and apparatus without departing from the spirit and the scope of this invention. It is realized that changes are possible and it is further intended that each element recited in any of the following claims is to be understood as referring to all equivalent elements for accomplishing substantially the same results in substantially the same or equivalent manner. It is intended to cover the invention broadly in whatever form its principles may be utilized. The present invention is, therefore, well adapted to carry out the objects and obtain the ends and advantages mentioned, as well as others inherent therein.

What is claimed is:

1. A cable tray walkway for walking over either a first cable tray or an adjacent second cable tray, the cable tray walkway comprising
   at least one movable walkway member disposable above either cable tray,
   the at least one movable walkway member movably connected to articulation means,
   the articulation means disposed for moving the at least one movable walkway member from a first position over the first cable tray to a second position over the second cable tray, the articulation means including at least one hinge member secured to one or both of the cable trays, and
   a bracket secured to the at least one movable walkway member and movably mounted on the at least one hinge member.

2. The cable tray walkway of claim 1 wherein
   the at least one movable walkway member is a plurality of movable walkway members each with its own articulation means.

3. The cable tray walkway of claim 2 wherein
   the plurality of movable walkway members extend along substantially all of the length of the cable trays.

4. The cable tray walkway of claim 1 wherein
   the at least one movable walkway member rests on a cable tray which is beneath it.

5. The cable tray walkway of claim 1 wherein
   a walkway support member is spaced apart from each cable tray, and
   the at least one movable walkway member has two sides, one of which is connected to the articulation means and supported thereby and the other of which is supported by the walkway support member spaced apart from the cable tray above which is the movable walkway member.

6. The cable tray walkway of claim 1 wherein
   the at least one movable walkway member has openings in it so that contents of a cable tray under the movable walkway member may be seen through the movable walkway member.

7. The cable tray walkway of claim 6 wherein
   the at least one movable walkway member is grating.

8. The cable tray walkway of claim 7 wherein
   the grating is made from fiber reinforced plastic suitable for bearing the weight of workers walking thereon.

9. The cable tray walkway of claim 1 wherein the at least one movable walkway member has openings therethrough for ventilating contents of a cable tray under the at least one movable walkway member.

10. The cable tray walkway of claim 1 wherein
    a support beam extends between the cable trays, and
    the articulation means is mounted to the support beam.

11. A cable tray walkway system for walking over a first plurality of adjacent rows of cable trays and for accessing at least one additional row of cable trays adjacent the first plurality of rows of cable trays, the cable tray walkway system comprising
    a plurality of movable walkway members,
    each movable walkway member movably connected to articulation means disposed for moving the movable walkway member from a first position over one cable tray of the first plurality of adjacent rows of cable trays to a second position over a second cable tray of the first plurality of adjacent rows of cable trays, the at least one additional adjacent row of cable trays including a plurality of additional cable trays, each of which is located so that a movable walkway member of the plurality of movable walkway members is disposable over a cable tray immediately adjacent each of the additional cable trays, the articulation means including for each movable walkway member at least two hinge members spaced apart on and mounted to a support member disposed beneath the cable trays and to which the cable trays are secured, and two brackets secured to each movable walkway member, each bracket movably mounted on one of the two hinge members.

12. The cable tray walkway of claim 11 wherein a support beam extends between the cable trays, and the articulation means is mounted to the support beam.

13. A cable tray comprising
a pair of spaced-apart opposed parallel side rails,
at least one transverse support extending between the side rails for supporting thereon cables or the like,
at least one movable walkway member movably connected to articulation means,
the articulation means secured to the cable tray or to a support supporting the cable tray or adjacent thereto,
the articulation means disposed for moving the at least one movable walkway member from a first position over the cable tray to a second position not over the cable tray,
the articulation means including for each movable walkway member two hinge members spaced apart and mounted to the support supporting the cable tray, and
two brackets secured to each movable walkway member, each bracket movably mounted to one of the hinge members.

14. The cable tray of claim 13 wherein the at least one movable walkway member is a grating with openings for ventilating contents of the cable tray.

15. The cable tray of claim 13 including a handrail assembly secured to one of the side rails.

16. A cable tray walkway for walking over either a first cable tray or an adjacent second cable tray, the cable tray walkway comprising
at least one movable walkway member disposable above either cable tray,
the at least one movable walkway member movably connected to articulation means,
the articulation means disposed for moving the at least one movable walkway member from a first position over the first cable tray to a second position over the second cable tray,
the articulation means including at least one hinge member mounted to a support member disposed beneath the cable trays and to which the cable trays are secured, and
a bracket secured to the at least one movable walkway member and movably mounted on the at least one hinge member.

17. A cable tray walkway for walking over either a first cable tray or an adjacent second cable tray, the cable tray walkway comprising
at least one movable walkway member disposable above either cable tray,
the at least one movable walkway member movably connected to articulation means,
the articulation means disposed for moving the at least one movable walkway member from a first position over the first cable tray to a second position over the second cable tray,
the articulation means including at least one hinge member having a lower portion disposed between the cable trays and unconnected thereto, and
a bracket secured to the at least one movable walkway member and movably mounted on the at least one hinge member.

18. A cable tray walkway for walking over either a first cable tray or an adjacent second cable tray, the cable tray walkway comprising
a plurality of movable walkway members disposable above either cable tray,
the movable walkway members movably connected to articulation means,
the articulation means disposed for moving the movable walkway members from a first position over the first cable tray to a second position over the second cable tray,
the plurality of movable walkway members extending along substantially all of the length of the cable trays and having openings in them so that contents of a cable tray under the movable walkway member are ventilated and may be seen through the movable walkway member,
the articulation means including hinge members mounted to a support member disposed adjacent the cable trays, or beneath the cable trays and to which the cable trays are secured, and
at least one bracket secured to each of the movable walkway members and movably mounted on one of the hinge members.

19. A cable tray comprising
a pair of spaced-apart opposed parallel side rails,
a plurality of transverse supports extending between the side rails for supporting thereon cables or the like,
articulation means secured to the cable tray or to a support supporting the cable tray or adjacent thereto,
a plurality of movable walkway members connected to the articulation means, the articulation means for moving the movable walkway members from a first position over the cable tray to a second position not over the cable tray, and
the articulation means including two hinge members for each movable walkway member, the hinge members spaced apart and mounted to the support supporting the cable tray, the movable walkway members secured to the hinge members.

20. The cable tray of claim 19 including a handrail assembly secured to one of the side rails.

21. A cable tray walkway system for walking over a first plurality of adjacent rows of cable trays and for accessing at least one additional row of cable trays adjacent the first plurality of rows of cable trays, the cable tray walkway system comprising
a plurality of movable walkway members,
each movable walkway member movably connected to articulation means disposed for moving the movable walkways members from a first position over one cable tray of the first plurality of adjacent row of cable trays to a second position over a second cable tray of the first plurality of adjacent rows of cable trays, the movable walkway members resting on cable trays beneath them, the at least one additional adjacent row of cable trays including a plurality of additional cable trays each of which is located so that a movable walkway member of the plurality of movable walkway members is disposable over a cable tray immediately adjacent each of the additional cable trays, the articulation means including for each movable walkway member two hinge members spaced apart on and mounted to a support member disposed beneath the cable trays and to which the cable trays are secured, and two brackets secured to each movable walkway member, each bracket movably mounted on one of the two hinge members.

22. A cable tray walkway system for walking over a first plurality of adjacent rows of cable trays and for accessing at least one additional row of cable trays adjacent the first plurality of rows of cable trays, the cable tray walkway system comprising a plurality of movable walkway members which contact and rest on the cable trays, each movable walkway member movably connected to articulation means disposed for moving the movable walkway member from a first position over one cable tray of the first plurality of adjacent rows of cable trays to a second position over a second cable tray of the first plurality of adjacent rows of cable trays, the at least one additional adjacent row of cable trays including a plurality of additional cable trays each of which is located so that a movable walkway member of the plurality of movable walkway members is disposable over a cable tray immediately adjacent each of the additional cable trays, the articulation means including for each movable walkway member two hinge members spaced apart on and mounted to a support member disposed beneath the cable trays and to which the cable trays are secured, and two brackets secured to each movable walkway member, each bracket movably mounted on one of the two hinge members.

* * * * *